United States Patent [19]

Downey et al.

[11] 4,126,764
[45] Nov. 21, 1978

[54] PARTIAL BYTE RECEIVE APPARATUS FOR DIGITAL COMMUNICATION SYSTEMS

[75] Inventors: David L. Downey, Peoria; James A. Kennedy; Liston E. Neely, both of Phoenix, all of Ariz.

[73] Assignee: Honeywell Information Systems Inc., Waltham, Mass.

[21] Appl. No.: 798,196

[22] Filed: May 18, 1977

[51] Int. Cl.$^2$ ................................. H04J 3/16
[52] U.S. Cl. ..................... 179/15 BA; 179/15 AF; 179/15 BV
[58] Field of Search ....... 179/15 BA, 15 BV, 15 BW, 179/15 AF, 15 BY

[56] References Cited

U.S. PATENT DOCUMENTS

| | | | |
|---|---|---|---|
| 3,016,527 | 1/1962 | Gilbert | 179/15 BV |
| 3,241,135 | 3/1966 | Kuflik | 179/15 BV |
| 3,591,722 | 7/1971 | Palsa | 179/15 BY |
| 3,632,882 | 1/1972 | Gecienski | 179/15 BA |
| 3,668,645 | 6/1972 | Reymond | 179/15 BA |
| 3,970,796 | 7/1976 | Gyurki | 179/15 AF |

*Primary Examiner*—David L. Stewart
*Attorney, Agent, or Firm*—Nicholas Prasinos; Ronald T. Reiling

[57] ABSTRACT

An apparatus in a digital communication system having the capability for transmitting or receiving a partial byte in the final byte position of the information field. Thus, a non-byte-oriented message may be blocked into bytes of any convenient size, and the final bits, if they do not completely fill up the final byte, can still be accommodated using the partial byte capability. The size of the final byte is indicated by adding a pointer bit to the character in memory. The partial character is right justified in its byte and a one (i.e. pointer bit) is inserted immediately to the left of the character and zeros are filled to the left to complete the byte. This byte is placed in a transmit register; a partial byte is shifted to the right until a pattern of all zeros and a one remain in the register; this pattern is recognized by the hardware and indicates that the end of the partial byte has been transmitted. For received data, the process is reversed.

5 Claims, 18 Drawing Figures

| SIZE OF PARTIAL BYTE | FORMAT IN MEMORY |
|---|---|
| 7 BITS | MSB 1 X X X X X X X LSB |
| 6 BITS | 0 1 X X X X X X |
| 5 BITS | 0 0 1 X X X X X |
| 4 BITS | 0 0 0 1 X X X X |
| 3 BITS | 0 0 0 0 1 X X X |
| 2 BITS | 0 0 0 0 0 1 X X |
| 1 BITS | 0 0 0 0 0 0 1 X |

PARTIAL BYTE RECEIVE APPARATUS FOR DIGITAL COMMUNICATION SYSTEMS

RELATED APPLICATIONS

1. "Partial Byte Transmit Apparatus For Digital Communication Systems" invented by David L. Downey et al., and assigned to the same assignee as the instant application, and having the same filing date as the instant application.

BACKGROUND OF THE INVENTION

1. Field of the Invention

This invention relates to digital communications systems and more particularly to an apparatus and method having the capability to transmit or receive a partial byte in the final byte position of the information field so that the final bits, if they do not completely fill up the final byte character, can still be accommodated using the partial byte capability.

2. Description of the Prior Art

There is a great network of telecommunications links that span the industrialized countries of the world. This network can be utilized by computer systems to transmit and receive data over communication lines. Data transmission can be either synchronous or asynchronous which is also often known as start-stop transmission. With asynchronous transmission one character is sent at a time by initializing first with a "start" signal and then ending with a "stop" signal. The pulses between the "start" and "stop" signal identify the bits of which the character is composed. As can readily be seen, asynchronous transmission is rather slow. It is desirable therefore to transmit characters continuously wherein the bits of one character are followed immediately by those of the next. Between these characters there are no "start" or "stop" signals and no pauses. The stream of characters of this type is generally divided into blocks or messages which may in turn be subdivided into characters. All of the bits of the message are transmitted at equal time intervals and the transmitting and receiving machines must be exactly in synchronization for the duration of the message, so that the receiving machine knows which is the first bit and thus recognize which are the bits of each character. In earlier forms of prior art, a synchronous message generally started with a sequence of synchronization characters (usually 3 or 4), and ended with a unique "end of message" character, often followed by a character or characters containing longitudinal parity or cyclic redundancy check data, enabling the receiver to verify the integrity of the data in the message by means well known to the art. Data within the message was in the form of groups of equal-length (typically 8-bit characters (often called bytes), with special characters used to separate header, text and other logical blocks of data. Systems of this type are inefficient or cumbersome in operation which it is desired to transmit binary (non-byte-oriented or non-text-oriented) data over the communications network. An example of non-text type data would be analog data which has been converted to binary data for transmission. Another example would be the transmission of computer programs where the native word size of the computer's memory (normally corresponds to the number of bits in a typical machine "instruction" - e.g., 36-bit) is not readily divisible into the 8-bit bytes (or 7 bits plus a parity bit) normally used for transmission. One problem is, therefore, that binary (non-text) data often is not conveniently divisible into bytes for transmission. Another problem is that binary data, by its very nature, may be presumed to assume any possible combination of values of bits (ones and zeros), whereas byte-oriented data organized for transmission over communications lines has certain bit combinations (i.e., character "values") reserved for special control functions. These control characters are the synchronization, end of message, and blocking characters referred to earlier. The obvious danger in transmitting binary data in such a system is that the binary data may by coincidence assume the combination of bits associated or assigned to a communications control character (because with binary data no bit combinations are reserved or precluded). This could cause the receiver to initiate control action prematurely or improperly.

Recently, a new class, or type of data transmission system has begun to evolve. This is the so-called "bit-oriented" control procedure. It exists in various forms and by various trade names as offered by individual manufacturers. A standardized version of a bit-oriented procedure is being developed and documented by the American National Standards Institute, Inc. (ANSI), 1430 Broadway, New York, New York 10018. It is known as ADCCP (Advanced Data Communication Control Procedure). These bit-oriented transmission procedures offer particular advantages for the transmission of binary or non-text-oriented data. This is because the discipline or procedure eliminates (at least theoretically) the two problems discussed in the previous paragraph. A technique implicit in the ADCCP discipline eliminates the possibility that random patterns of the data bits may inadvertently assume the bit configurations of communications control characters. The technique is called "zero bit insertion/deletion" and will be discussed later. In addition, the data in the information portion of an ADCCP frame (message) is completely arbitrary in nature. It is not restricted to a sequence of fixed-length bytes (characters). This is an ideal situation for the transmission of binary data, since presumably a "string" of binary data of an arbitrary number of bits could be directly transmitted without regard for blocking into fixed-length bytes. Theoretically such is the case. To be practical, however, the world of computers is a byte-or word-oriented world. All of the registers, data paths, arithmetic units and storage media are constructed and organized to handle fixed-length entities. Such is also the case with computer data communications channels. Therefore binary data will inevitably be positioned, or blocked, into fixed-length bytes for convenience of storage, processing and transmission. In doing this, however, there may be an insufficient number of bits to completely fill the final byte. One solution to this problem might be to pad the final byte with "fill" bits so as to make it a full byte. This involves overhead on the part of the transmitting computer, and the receiving computer, to add and later strip the fill bits. It also involves overhead on the communications channel to transmit the fill bits. Since it is desired to use computers and communication channels efficiently and since many such partial bytes may be encountered in message transmissions, it is desirable to transmit only those bits comprising the partial byte for greater utilization of the communication channel.

OBJECTS OF THE INVENTION

It is a primary object of the invention therefore to provide an improved data transmit and receive subchannel for a digital communication system.

It is another object of the invention to provide an improved channel for a digital communication system having the capability to transmit or receive a partial byte in the final position of the data or information field.

It is still a further object of the invention to provide a method for a digital communication system for transmitting or receiving a partial byte in the final byte position of the data or information field.

SUMMARY OF THE INVENTION

In accordance with the above and other objects of the invention, there is provided a hardware capability in a digital communication system for transmitting or receiving a partial byte in the final byte position of the information or data field. Thus, a non-byte-oriented message is blocked into bytes of any convenient size, and the final bits, if they do not completely fill up the final byte, can still be accommodated using a partial byte capability. The size of the final byte is indicated by adding a pointer bit to the character. The partial character is right justified in this byte and a one (i.e. pointer bit) is inserted immediately to the left of the character, and zeros are filled to the left to complete the byte. The apparatus determines if the final byte is a partial byte by counting the bits received and noting whether or not there is less than the requisite amount of bits in the character when the ending flag is detected. The hardware then automatically adds a pointer bit to the left of the bits received and fills the remaining byte with zeros. This byte is then stored in the computer memory.

When it is required to transmit this byte from the memory to another location, it is placed in a transmit register which shifts this byte to the right out of its final register while shifting in zeros from the left until the apparatus detects all zeros and a one remaining in the register which indicates the end of the partial byte which is being transmitted. The apparatus will then shift out the frame check sequence and the ending flag to terminate the message.

DESCRIPTION OF THE PREFERRED EMBODIMENT OF THE INVENTION

General

The invention can be adapted readily by one skilled in the art to any communications discipline where partial byte capability is desired. However, the ADCCP bit-oriented discipline is the most suitable discipline for transmission of binary data. It is in this discipline, therefore, that the partial byte capability will be most effectively utilized. The preferred embodiment of the partial byte apparatus as disclosed here will be as used in conjunction with a typical apparatus for transmitting and receiving ADCCP type data. Specifically, the invention is utilized in High Level Data Link Control (HDLC) transmission, a bit-oriented discipline compatible with ADCCP, offered by Honeywell. The invention may typically be utilized in a Honeywell 6000 computer system together with a DATANET ® 6600 Front End Communications Processor.

In order to describe the preferred embodiment of this invention in the HDLC environment, it will be necessary to first describe the HDLC format and basic principles as well as the applicable portions of a typical HDLC receiver apparatus. Then the modifications to this apparatus to implement the subject invention will be described. It should be emphasized that the following discussion of HDLC is not intended to be a complete description of all of the details of that discipline - many of the specific details and features are not relevant to the partial byte invention. However, sufficient detail will be provided to fully explain the basic framework within which the invention is utilized.

Figure 1A:
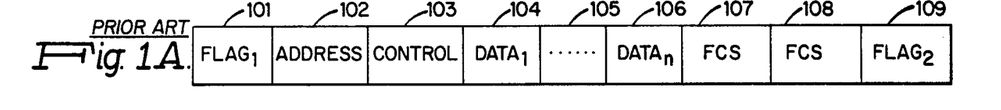
FIG. 1a is a typical format of a prior art basic message.
Figures 1B, 1C:
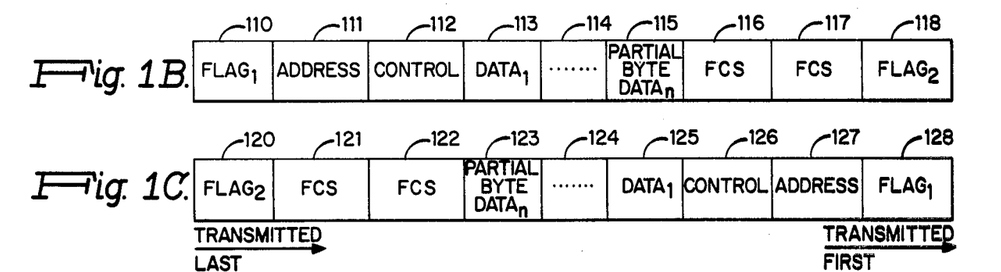
FIG. 1b is a typical format for a message having a partial byte in its last position.
FIG. 1c is the format of FIG. 1b illustrating the sequence or transmission of a message.

FIGS. 1a–1c show some typical formats utilized in HDLC. Referring to FIG. 1a, there is shown a message called a frame in HDLC, which is preceded by a FLAG 101. The FLAG has a special bit pattern as follows: 01111110. The FLAG character 101 is followed by an ADDRESS character 102 which is also 8 bits in length and is used in applications where there are multiple communications terminals interconnected in a single network. The CONTROL character 103 follows the ADDRESS character and is an 8-bit character which provides control information utilized by the transmitting and receiving stations. The data may comprise any number of DATA characters 104–106. It should be noted here that for this example all DATA characters DATA$_1$ through DATA$_n$ are 8 bits in length. This is not a requirement of HDLC, which allows for data characters of different sizes. However, in order to simplify the discussion, all subsequent references to data characters will assume 8-bit characters except when the final character is a partial character (partial byte). That portion of the HDLC frame containing the data characters is called the Information Field. Following the Information Field, there are two frame check sequence characters (FCS) 107, 108, each 8 bits in length which check for errors. Finally, a FLAG$_2$ character 109 is appended at the end of the message. FIG. 1b is similar to FIG. 1a with the exception that the final DATA character 115 is not 8 bits in length but a partial byte which may vary from one to seven bits. FIG. 1c is similar to FIG. 1b but with the sequence of characters reversed to illustrate the sequence of transmission of each character and its progress through the various shift registers of the invention.

The Flag character (01111110) is used to mark the beginning and the end of each HDLC frame. During the frame in the interval from the beginning of the Address character to the end of the Frame Check Sequence, a special technique is employed to preclude the occurrence of the Flag pattern (01111110). After transmitting the beginning Flag, the HDLC transmitter monitors the outbound data stream and inserts a "zero" bit following any occurrence of five consecutive "one" bits. This is continued until the FCS sequence has been transmitted. Then the closing Flag is transmitted with the zero bit insertion logic inhibited. Conversely, the HDLC receiver monitors the inbound data stream and deletes any zero bit which follows five consecutive one bits. The transmitter's zero bit insertion procedure eliminates the possibility of a Flag pattern occurring in the data between the beginning and ending Flags. The receiver's zero bit deletion procedure eliminates those zero bits added by the transmitter and returns the data to its original form.

Figure 3A:
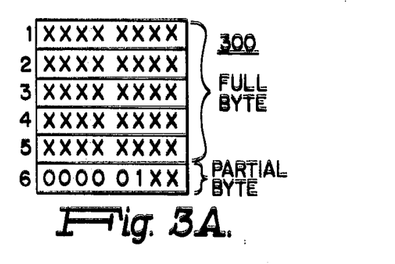
FIG. 3a illustrates the storage of a typical partial byte message in the main memory of a computer.
Figure 3B:
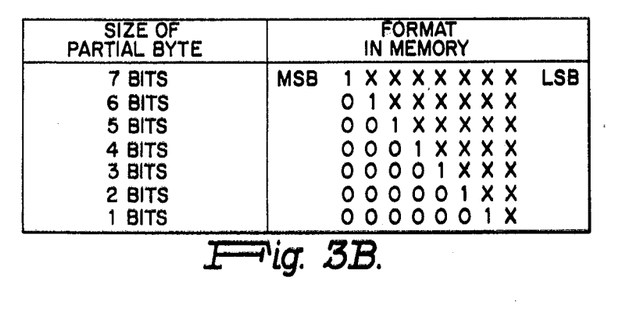
FIG. 3b illustrates the various partial byte messages.
Figure 4:
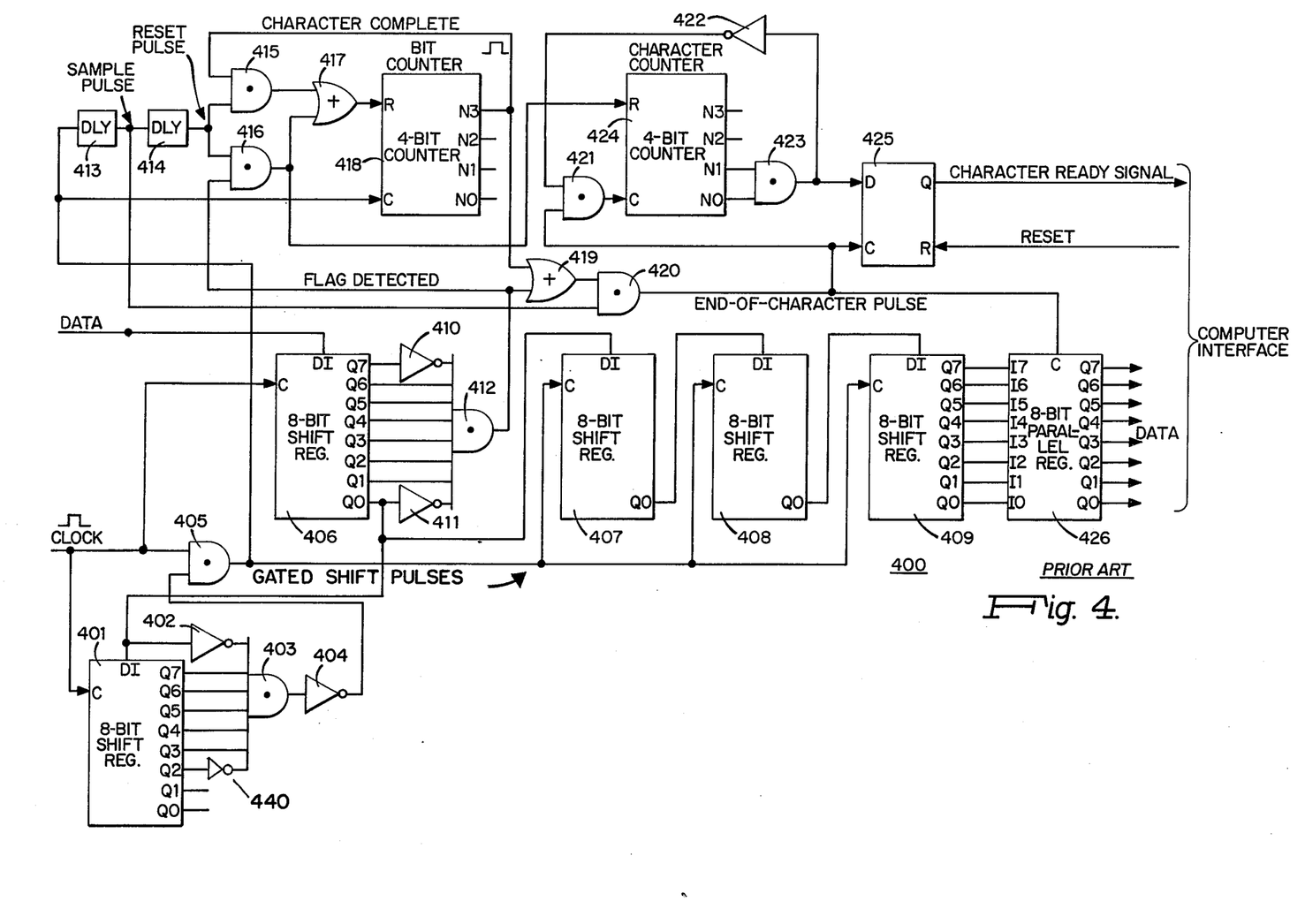
FIG. 4 is a schematic logic block diagram of a typical prior art HDLC receiver.

Referring now to FIG. 3a, there is shown an example of a computer memory 300 having stored therein 5 bytes 1-5 comprising 8 bits each byte and a sixth byte comprising a partial byte of only two bits followed by a one immediately to the left of the left-most bit which in turn is followed by all zeros. FIG. 3b, shows partial bytes typically handled by the invention although other groupings may easily be discerned by a person of ordinary skill in the art. For example, the first row of FIG. 3b shows a full 8 bit byte; the second view shows a 7 bit partial byte, etc. Referring to FIG. 4, there is shown a logic block diagram of a typical prior art HDLC receiver apparatus. During the following description, it will be helpful to keep in mind the format of the HDLC frame as shown in FIG. 1. First, the circuitry and operation of the basic functional blocks will be described.

All flip-flops shown in FIGS. 4, 5, 7, 8 and 9 are the D-type flip-flops similar to those in the SN7474 integrated circuit, although other types may be utilized for the invention. The SN7474 contains two D-type flip-flops in one package. It is described in pages 120-132 of the TTL Data Book for Design Engineers, First Edition, published by Texas Instruments, Inc. Data on the "D" terminal of the flip-flop is clocked into the flip-flop by a pulse on the "C" terminal, and appears as an output at the Q terminal. The flip-flop may be reset to a logic "zero" by a signal on the "R" terminal. Flip-flop 425 in FIG. 4 is typically such a flip-flop.

Four-bit counters 418 and 424 on FIG. 4 are similar to the SN74161 described on pages 325-333 of the previously-mentioned TTL Data Book. The counter has four outputs; N0, N1, N2 and N3. N0 is the least significant bit of the counter and N3 is the most significant bit. Each clock pulse applied to the "C" terminal of the counter increments (advances) the counter by one binary count. The counter may be reset to all zeros by a signal on the "R" terminal.

Delay lines 413 and 414 of FIG. 4 are conventional circuit delay elements whose purpose is to delay a pulse by a nominal amount so as to achieve desired circuit timing.

Figure 5:
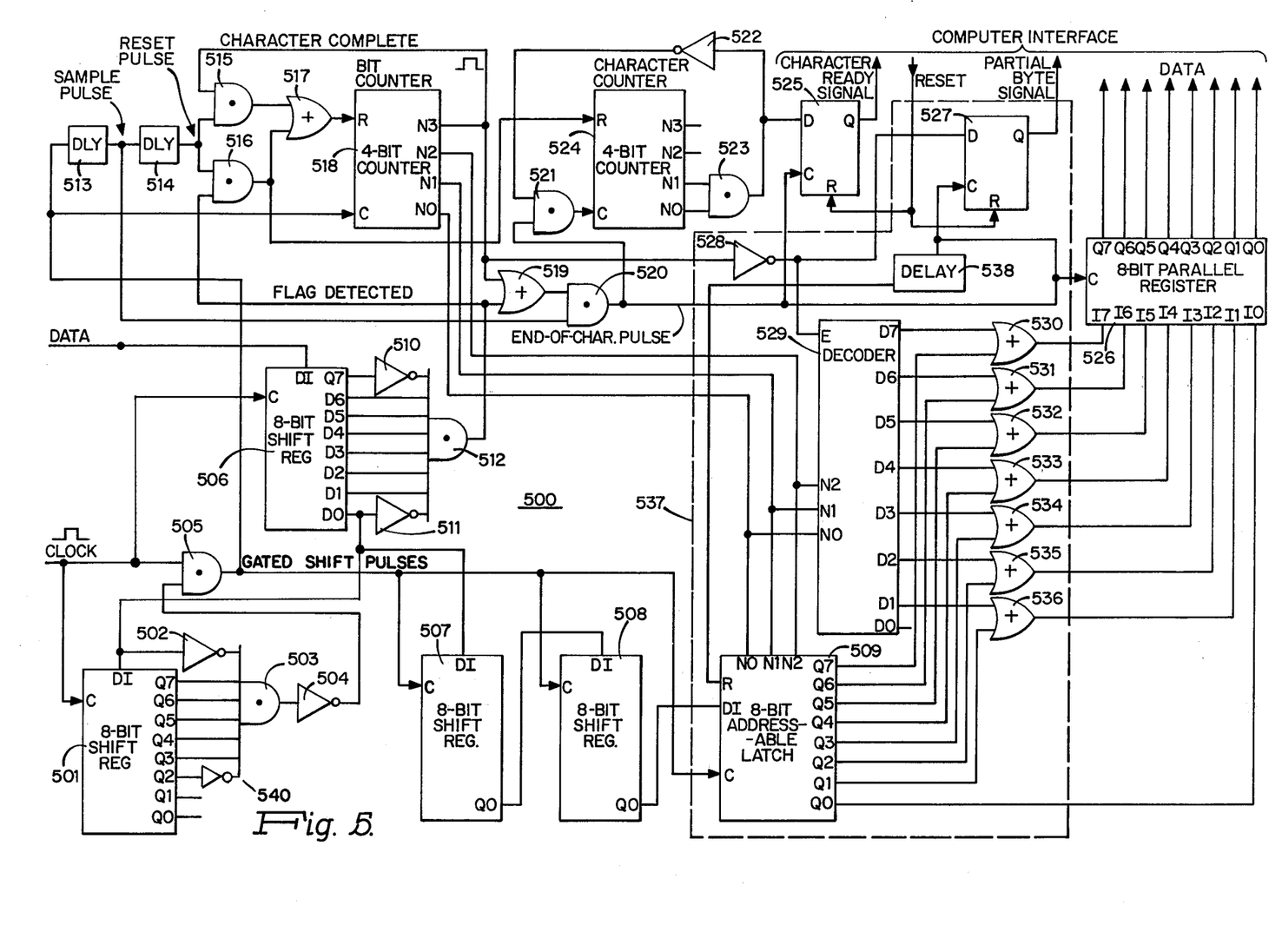
FIG. 5 is a schematic logic block diagram of the invention having partial byte capability.
Figures 6, 7A, 7B, 7C:
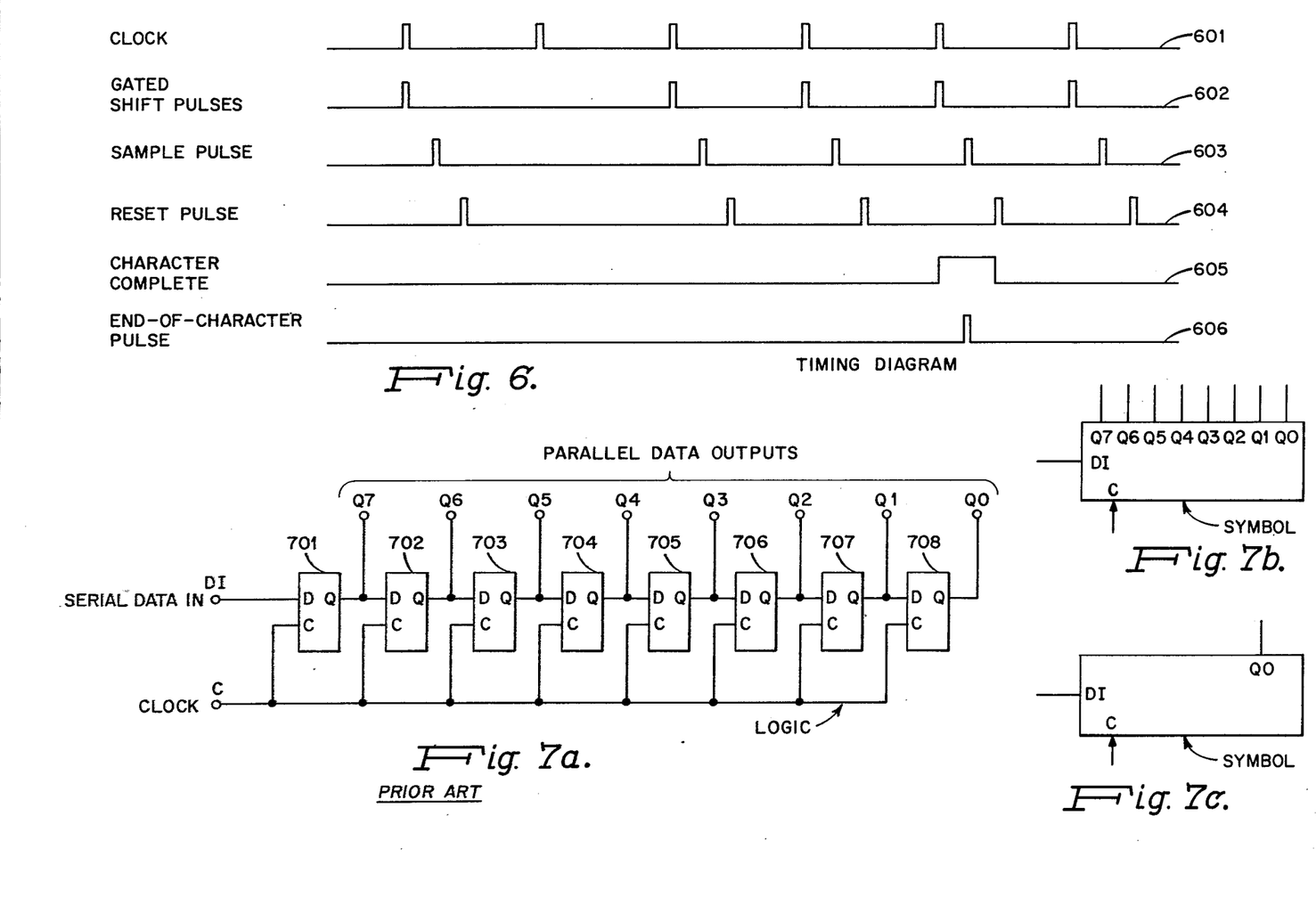
FIG. 6 shows timing diagrams of the invention.
FIGS. 7a–7c are logic diagrams of a typical prior art 8-bit shift register utilized in the invention.

Eight bit shift registers 401, 406, 407, 408 and 409 of FIG. 4 are conventional shift registers such as diagrammed in FIG. 7a. The clock line from the "C" terminal is applied to all eight flip-flops comprising the 8-bit shift register. Each clock pulse causes the data from the DI (data in) terminal to be clocked into the first flip-flop 201. Simultaneously, the data in each flip-flop is transferred to the next flip-flop in the register; i.e., the data in flip-flop 701 is transferred into flip-flop 702; 702 is transferred into 703, etc. FIGS. 7b and 7c show symbols for the eight-bit shift register. These symbols are used in FIGS. 4 and 5.

Figure 9A:
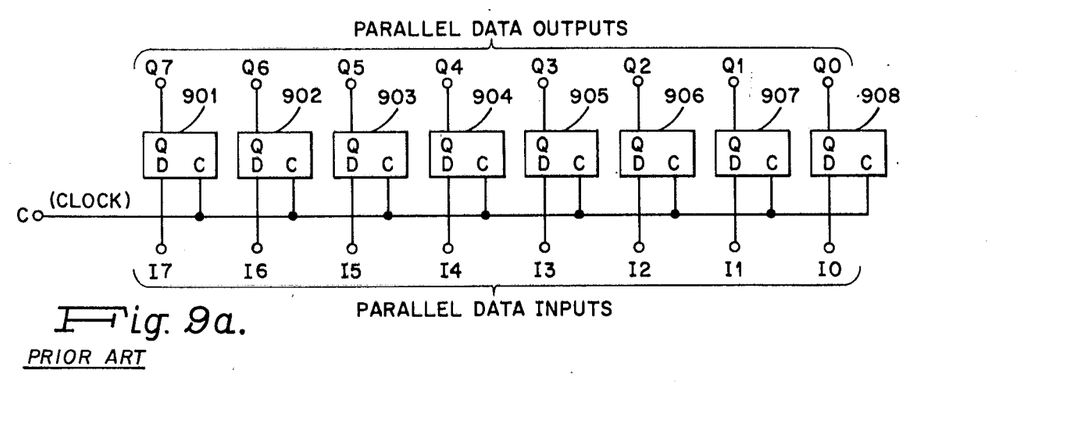
FIGS. 9a–9b are prior art logic diagrams of a typical prior art 8-bit parallel register.
Figure 9B:
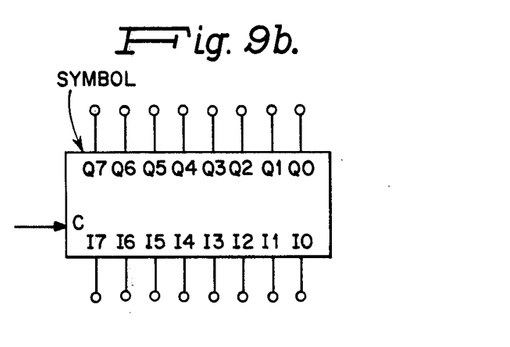

Eight-bit parallel register 426 of FIG. 4 is a conventional buffer register diagrammed in FIG. 9a. A clock pulse on terminal "C" is applied to all eight flip-flops. Each clock pulse causes the data on data input terminals I0-I7 to be stored in flip-flops 901-908 and presented as outputs on terminals Q0-Q7. FIG. 9b is the symbol for the eight-bit parallel register used in FIGS. 4 and 5.

In order to aid in the subsequent detailed description of the HDLC receiver apparatus of FIG. 4, the basic functions performed by each of the registers and counters will be described. Shift register 401 of FIG. 4 serves to store the six previously received data bits for use by the logic which deletes a "zero" bit which follows five contiguous "one" bits. This is part of the logic which precludes the occurrence of a flag pattern in the data between the beginning and ending flags, as described earlier in page 11, lines 1-17.

The received data passes sequentially through shift register 406, 407, 408 and 409. Register 406 is used to drive decoding logic composed of AND gate 412 and inverters 410 and 411. This logic detect the beginning and ending flag characters of the HDLC frame - characters 101 and 109 respectively of FIG. 1a. When the ending flag is detected in register 406, registers 407 and 408 hold the two frame check sequence characters (107 and 108 of FIG. 1a), which may then be examined by additional logic (not shown) for the purpose of detecting transmission errors. Shift register 409 is used to perform serial-to-parallel conversion of the received data, which is then transferred to parallel holding register 426, from which it is read by the computer. Flip-flop 425 is set each time a valid character is transferred from shift register 409 to parallel register 426. Flip-flop 425 thus serves as a character ready signal to the computer, indicating that valid data is present in register 426 ready to be read. Counter 418 is the bit counter. It is incremented each time a new received data bit is shift into register 406. Since all characters are eight bits long, each time bit counter 418 reaches a count of eight, it indicates that a new character has been received. An end-of-character pulse is generated at that time. It is used to increment character counter 424. Counter 424 is incremented as each new character is received and is used to indicate when the first valid data character has progressed through the receiver into register 409. At this point, it enables character ready flip-flop 425 so that valid characters will be transferred to the computer.

The detailed operation of the typical HDLC receiver apparatus of FIG. 4 will now be described. Serial data from the communications interface is shifted through 8-bit shift register 406 to the serial data input (DI) terminal of 8-bit shift register 401. A clock pulse from the communications interface is applied to the clock input (c) terminals of registers 401 and 406. The clock signal is assumed to be a narrow pulse occurring at the midpoint of each received data bit. Thus received data bits are shifted into register 401. The first five outputs of register 401 (Q7, Q6, Q5, Q4 and Q3), and the Q2 output inverted by inverter 440, are connected to input terminals of AND gate 403. The input data signal is inverted by inverter 402, and this inverted data is also connected to an input terminal of AND gate 403. If a "zero" followed by five consecutive "one" bits have been received, the Q3, Q4, Q5, Q6 and Q7 outputs of register 401, and the output of inverter 440, will be ones. If the next data bit from register 406 is a zero, the input of inverter 402 is a zero and its output is a one. Hence, the seven inputs of AND gate 403 will all be ones and the output of AND gate 403 will be a one. The input of inverter 404 will also be a one since it is connected to the output of AND gate 403. The output of inverter 404 will be a zero and this signal is coupled to the input of AND gate 405, and disables that gate. Clock pulses from the communications interface are connected to the other input of AND gate 405. They normally pass through gate 405, except when the output of inverter 404 is a zero, as just described. Thus the output of AND gate 405, referred to as gated shift pulses, will be the clock pulses supplied by the communications interface, except that certain clock pulses will be deleted (missing). The deleted clock pulses are those which correspond to a zero data bit which follows five consecutive one bits, as detected by the operation of register 401, and gate 403, and inverters 402, 440 and 404, as just described.

Referring now to timing diagrams, FIG. 6, there is shown a deleted clock pulse. Diagram 601 shows the stream of clock pulses received from the communications interface, and diagram 602 shows the gated shift pulses from gate 405. Note that one of the clock pulses from 601 has been deleted from the gated pulses of 602 to illustrate the action of the logic.

Serial data from the communications interface is applied to the serial data in (DI) terminal of shift register 406. The output of the last stage (Q0) of register 406 is connected to the input of register 407 such that as data shifts out of register 406, it shifts into register 407. Similarly, the output of register 407 is connected to the input of register 408, the output of register 408 is connected to the input of register 409. The gated shift pulses generated by AND gate 405 are applied to the clock (c) inputs of the three 8-bit shift registers 407, 408 and 409. These pulses shift the serial received data bits sequentially through the three shift registers. AND gate 412 and inverters 410 and 411 detect the presence of the beginning flag character in register 406. The binary pattern of the flag is 01111110. When this pattern is in register 406, the outputs of stages Q1, Q2, Q3, Q4, Q5 and Q6 will all be ones, and these are applied directly to the input of AND gate 412. The outputs of stages Q7 and Q0 will be zeros, but these are inverted by inverters 410 and 411 respectively so as to present ones to the input of AND gate 412. Thus the output of AND gate 412 will be a one when the beginning flag character is in register 406, indicating the impending arrival of an HDLC frame. The output of AND gate 412 is applied to AND gate 416. The gated shift pulses are delayed by delay lines 413 and 414 to form the signal identified as "reset pulse" at the output of 414. The reset pulse is also connected to the input of AND gate 416. Therefore, when the flag is shifted into register 406 causing the output of gate 412 to be a one, a delayed shift pulse (reset pulse) passes through AND gate 416. This pulse is applied to the reset terminal of character counter 424, and after passing through OR gate 417, is also applied to the reset terminal of bit counter 418. Thus the bit counter 418 and the character counter 424 are reset to a count of zero by the occurrence of the beginning flag character in register 406.

Referring to FIG. 1c, there is shown the characters of the frame in the order in which they progress through the shift registers 406, 407, 408 and 409. As the bits of the address character arrive, they are shifted into register 406 as, concurrently, the bits of the flag character are shifted from register 406 to register 407. Gated shift pulses from gate 405 are applied to the clock (c) input of bit counter 418. As each new bit arrives, the count in bit counter 418 is increased by one. When the eight bits of the address character have been received and shifted into register 406, the bit counter will have advanced to a count of eight. A binary count of eight in 4-bit counter 418 results in a "one" output from the most significant section N3, and a "zero" output from sections N2, N1 and N0. The N3 output of counter 418, identified as the "Character Complete" signal, is coupled through OR gate 419 to an input of AND gate 420, together with a gated shift pulse delayed by delay line 413 to form a pulse identified as "Sample Pulse". The resulting pulse at the output of gate 420 is called the "End-of-Character Pulse".

Character counter 424 was previously reset to zeros by the arrival of the flag as described earlier. Its N0 and N1 outputs are zero and the output of AND gate 423 is therefore zero. The output of inverter 422 will be a one, enabling AND gate 421, and the end of character pulse will pass through gate 421 and will advance character counter 424 to a count of one. The end-of-character pulse is also applied to the clock (c) input of 8-bit parallel register 426. This causes the data in shift register 409 to be stored in register 426. However, this data is not as yet valid. Character ready flip-flop 425, also clocked by the end-of-character pulse, will not set because its data input comes from the output of gate 423, which is a zero at this time. Hence, the computer will not be signalled to read the data in register 426.

After the end-of-character pulse has been generated, the reset pulse from delay line 414 is applied to AND gate 415. It will pass through this gate since the N3 output of bit counter 418 is a one. The resulting pulse at the output of AND gate 415 is coupled through OR gate 417 and applied to the reset input of bit counter gate 418, causing the counter to reset to a count of zero.

The timing diagrams of FIG. 6 illustrate the timing relationships between the various critical signals. Diagram 602 shows the gated shift pulses which clock the shift registers and the bit counter. Diagram 603 shows the shift pulses as delayed by delay line 413 to form the sample pulses. Diagram 604 shows the sample pulses delayed by delay line 414 to form the reset pulses. Diagram 605 shows the character complete signal which is initiated when the bit counter advances to a count of eight, and is terminated by the next reset pulse. Diagram 606 shows the end-of-character pulse, which is a sample pulse gated by the character complete signal. In the manner just described, the character counter is incremented one count as each new character is received, after the beginning flag is received. The character counter will have a count of one after the address character has entered register 406. It will have a count of two after the address character has shifted into register 407, and the control character shifted into register 406. It will be advanced to a count of three after the address character has shifted into register 408, the control character into 407, and the first data byte into 406. When the character counter 424 reaches the binary count of three, its two least significant bits N0 and N1 will both be ones, and the output of AND gate 423 and the data (D)

input of character ready flip-flop 425, will be a one. After eight additional data bits have been recieved, another end-of-character pulse is generated. At this time, the address character will have shifted from register 408 into register 409. The end-of-character pulse loads the parallel register 426 with the address character from register 409, and sets the character ready flip-flop 425. Since the output of AND gate 423 is a one, the output of inverter 422 is a zero, disabling AND gate 421. Therefore, the end-of-character pulse will not increment character counter 421, which remains "frozen" at the count of three, enabling (through AND gate 23) the character ready flip-flop to be set as subsequent characters are received.

The character ready signal notifies the computer that a character is ready to be read. The computer reads the character on the output lines of parallel register 426, and then sends a reset signal to the reset (R) terminal of character ready flip-flop 425.

This process of receiving characters continues as described until the ending flag character shifts into register 406. As this occurs, the two frame check sequence characters which precede the ending flag will be in registers 407 and 408 where they can be checked. The final data character of the frame will be in register 409, and will be immediately stored in register 426 by the end-of-character pulse. The Flag Detected signal from AND gate 412 will be a one, and the reset pulse will be gated through AND gate 416 and OR gate 417, thereby resetting the bit counter 418 and the character counter 424 exactly as described in connection with the beginning flag. The receiver is now initialized to the same state as was initiated by the arrival of the beginning flag. Indeed, under HDLC rules, the ending flag may also serve as the beginning flag for the next frame.

The operation of a typical prior art HDLC receiver apparatus as shown in FIG. 4 has been described. Operation of this apparatus is predicated on the assumption that the information portion of the frame is composed of a number of equal-length (8-bit) characters. A partial final byte would occur if the data character being shifted into register 409 is not complete (eight bits) when the ending flag is detected in register 406. The prior art typical HDLC receiver apparatus of FIG. 4 has no provision for detecting such a partial byte, and no provision for notifying the computer of its occurrence or of the number of bits in the final data byte.

FIG. 5 shows a typical HDLC receiver apparatus which has been modified to provide partial final byte capability. The apparatus of FIG. 5 is identical with that of FIG. 4 except that the final shift register 409 of FIG. 4 has been replaced in FIG. 5 by the logic shown within the dashed line 537. In order to describe this logic, it will first be necessary to describe the operation of two additional logic functional elements - a decoder, 529, and a 8-bit addressable latch, 509.

Figures 10A, 10B:
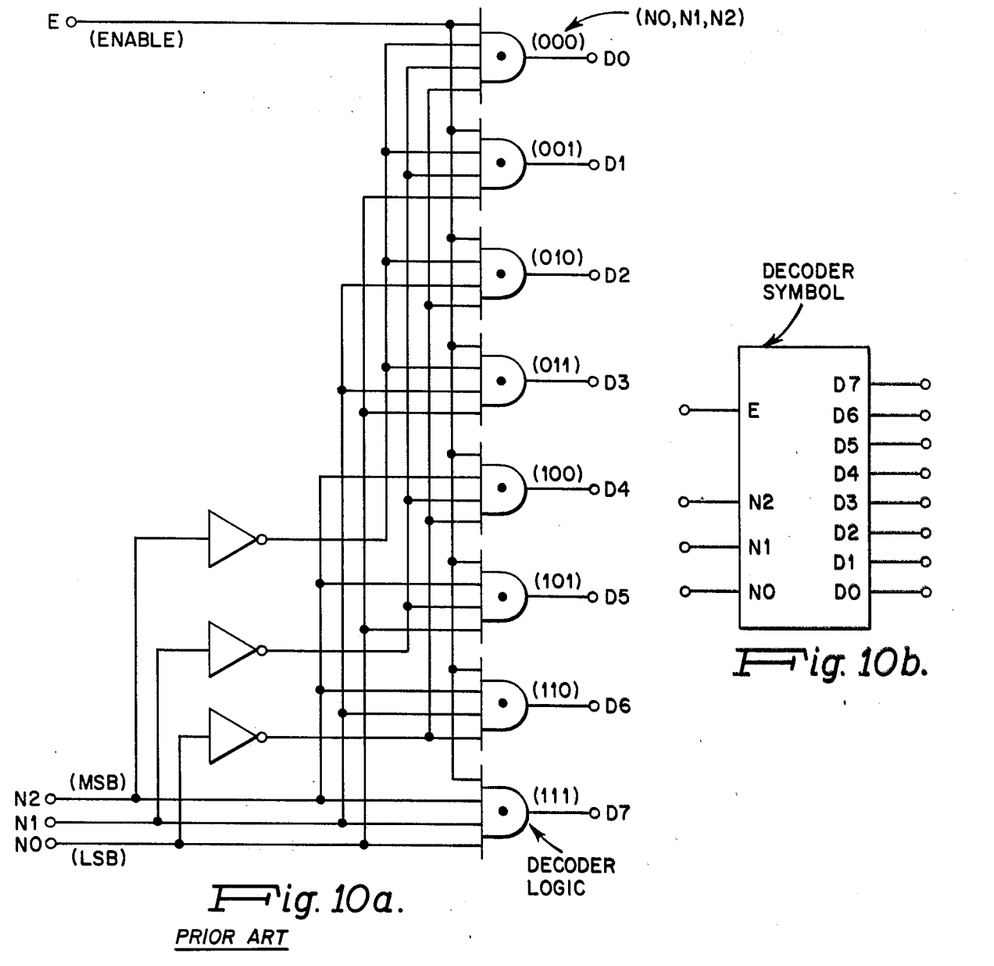
FIGS. 10a–10b are logic block diagrams of a typical prior art decoder.

FIG. 10A shows the logic diagram of the decoder, and FIG. 10B shows its logic symbol. The decoder is a conventional 3-bit binary to one-of-eight decoder with enable. In operation, the eight output lines D0–D7 are all zero when the enable input terminal (E) is at zero. When the enable input is at one, the three binary input lines N0, N1 and N2 are decoded such that one of the eight output lines D0–VD7 will be a one and the other seven will be zeros. One output line is decoded for each of the eight possible binary combinations of the input lines, i.e., output D0 will be one if the three input lines N0, N1 and N2 are all zero; output D1 will be one if N0, N1 and N2 are 1,0,0 respectively, etc. The parenthetical numbers shown on the output lines in FIG. 10A indicate the binary values of the input lines which produce a one on that line.

Figure 8A:
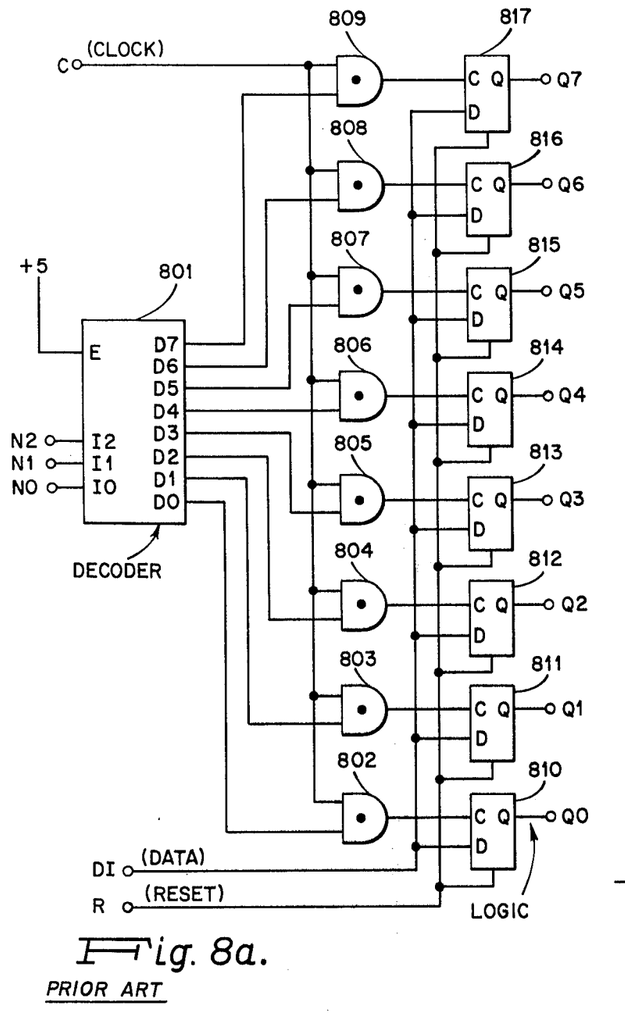
FIGS. 8a–8b are prior art logic diagrams of a typical prior art 8-bit addressable latch.
Figure 8B:
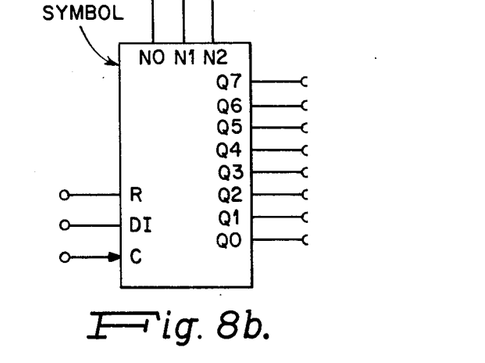

FIG. 8A shows the logic diagram of the 8-bit addressable latch, and FIG. 8B shows its logic symbol. This circuit contains eight flip-flop 810–817. Data from the data in (DI) terminal is connected to the D input of all eight flip-flops. This data is clocked into one of the flip-flops by a pulse steering mechanism composed of decoder 801 and AND-gates 802–809. Decoder 801 has its enable (E) input wired to a logic one, permanently enabling the circuit. A binary number on the three input lines N0, N1 and N2 causes one of the eight decoder output lines D0–D7 to be a one. This enables one of the eight AND-gates 802–809. A pulse on the clock (C) line will pass through the enabled AND-gate and clock the input data into the corresponding flip-flop. Thus data on the DI terminal may be clocked into any one of the eight flip-flops as selected by the inputs N0, N1 and N2.

Referring again to FIG. 5, operation of the HDLC receiver apparatus with partial byte capability will now be described. Data shifting out of register 508 is applied to the data input (DI) terminal of the 8-bit addressable latch 509, and gated shift pulses are applied to its clock (C) input. The select inputs N0, N1 and N2 are connected to the corresponding N0, N1 inputs N0, N1 and N2 are connected to the corresponding N0, N1 and N2 outputs of bit counter 518. As the first bit of a 8-bit character is shifted out of register 508, the outputs of the bit counter 518 will be zeros. This causes the data bit to be gated into stage Q0 of addressable latch 509 by the pulse steering mechanism previously described. When the next (second) bit of the character is shifted out of register 508, the bit counter outputs N0, N1 and N2 will be 1,0,0 respectively (binary count of one), steering the data bit into stage Q1 of addressable latch 509. In this manner, data bits shifting out of register 508 are accumulated bit-by-bit from right to left in latch 509, beginning with the first bit in stage Q0 and the last (eighth) bit in stage Q7. When the eighth bit has been stored in latch 509, the character complete signal from bit counter 518 will be a one. This signal, inverted by inverter 528, disables decoder 529 and also places a zero at the data input (D) terminal of flip-flop 527. The end-of-character pulse, which occurs during the character complete signal, is applied to the clock inputs of flip-flop 527 and parallel register 526. Flip-flop 527, the partial byte flip-flop, will not set, as inverter 528 is holding the flip-flop data input at zero. Data from latch 509 is coupled through OR-gates 530–536 to the input lines I0–I7 of register 526. Decoder 529 will not send any one bits to any of the OR-gates 530–536 because inverter 528 is holding the decoder's enable input at zero. The end-of-character pulse transfers the character, unmodified, from latch 509 into register 526. The same pulse, delayed by delay line 538, resets latch 509. Thus when accumulating a full eight-bit character, the logic within dashed line 537 operates in an identical manner functionally as the shift register 409 of FIG. 4, accumulating data serially and passing it unmodified to a parallel register.

When the final data byte of the frame (byte 123 of FIG. 1c) is a partial byte, operation of the logic is different. A partial byte occurs when the ending flag is detected in register 506 and a completed 8-bit character has not been accumulated in in latch 509. This would be indicated by a count of less than eight in the bit counter 518 when the ending flag is detected in register 506. When this occurs, the character complete signal will be a zero and the output of inverter 528 will be a one. This presents a one to the data input terminal of partial byte flip-flop 527 and also enables decoder 529. Decoder 529 presents a one bit to one of the OR-gates 530–536, causing a one bit, or pointer bit, to be OR'ed into the data character as it is transferred from latch 509 to register 526. The position of the pointer bit will depend on the count in the bit counter, and is arranged so that the pointer bit is always OR'ed into the character immediately to the left of the last data bit received. The flag detected signal from gate 512 passes through OR-gate 519 and enables AND-gate 520, gating through an end-of-character pulse. This pulse sets the partial byte flip-flop 527 and clocks the received partial byte, with the pointer bit appended, into register 526. FIG. 3A shows a partial byte of two bits stored in computer memory following a sequence of full bytes. FIG. 3B shows all possible partial byte configurations, from one to seven bits in length. Bits indicated by "X" in FIGS. 3A and 3B are data bits, and may be ones or zeros.

The computer is advised by the signal from partial byte flip-flop 527 that the final byte of the frame is a partial byte. It is further able to determine which are the valid data bits by searching from left to right in the byte until the first one bit is encountered. All bits to the right of this one bit are valid data bits.

Figure 2:
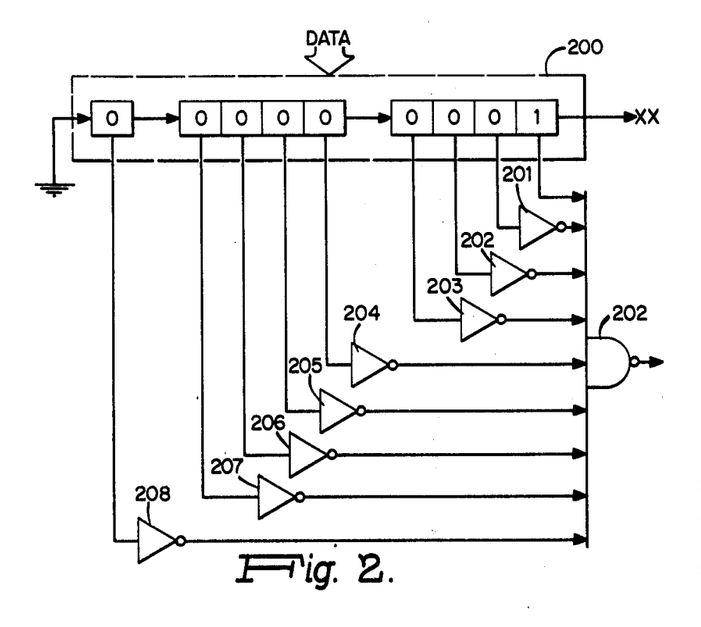
FIG. 2 is a schematic drawing of a partial byte transmission apparatus.

Referring now to FIG. 2, a transmit register is shown which is capable of receiving a partial byte from memory and transmitting it to another location. A register 200 similar to those commercially available from Texas Instrument Corporation and denoted as SN54166, SN74166 and SN54198 is typically parallel loaded from main memory 300 of FIG. 3 with data which may contain a partial byte 6 on FIG. 3. The data is then shifted serially to the right out of register 200. As data is shifted out of the register 200, zeros are shifted in. When the 2 bits of this example of the partial byte have been shifted out, the bits at register 200 will be as shown on FIG. 2. With this bit pattern applied as inputs to NAND gate 202, it will be enabled and a low output signal will result. This output signal may be inverted to a high signal and applied to indicate that the transmission of the partial byte is complete.

What is claimed is:

1. In a digital communication system for receiving information in groups of bits, each group having a predetermined number of bits, an apparatus for receiving information having a lesser number of bits than said predetermined number in each group, said apparatus comprising:
   (a) first means for counting the number of bits in each group of information received;
   (b) second means coupled to said first means for determining whether or not said number of bits received is less than said predetermined number of bits in each of said groups; and,
   (c) third means coupled to said second means for inserting zero bits to the group of bits having a lesser number of bits of information than said predetermined number.

2. The apparatus as recited in claim 1 including fourth means coupled to said first and second means for counting the number of groups of information received.

3. The apparatus as recited in claim 2 wherein said groups of information are combined into message units, each message unit comprising any number of said groups of information, each message unit being immediately preceded and followed with a predetermined pattern of bits for delineating each of said message units, said apparatus further including fourth means coupled to said first, second and third means for recognizing said predetermined pattern of bits.

4. The apparatus as recited in claim 3 wherein said predetermined pattern of bits is 01111110.

5. The apparatus as recited in claim 4 wherein said digital communication system includes a random access memory and further including means for storing said groups of bits of information in said random access memory.

* * * * *